Patented May 4, 1948

2,440,941

UNITED STATES PATENT OFFICE 2,440,941

ARC-WELDING ELECTRODE

Francis E. Garriott, West Allis, Wis., assignor to Ampco Metal, Inc., Milwaukee, Wis., a corporation of Wisconsin No Drawing. Application August 19, 1946, Serial No. 691,653

17 Claims. (Cl. 219—8)

This invention relates to an arc welding electrode of low melting point copper base alloy such as brass, Phosphor-bronze, silicon-bronze and the like.

The invention more particularly involves the composition of a covering for the metal core of such an electrode which greatly facilitates the welding operation and the production of sound welds in iron, copper and nickel base alloys.

One of the principal objects of the invention is to provide an electrode of copper base alloy of the type referred to which is capable of use in all positions: vertical, overhead and downhand, and for single and multiple pass welding, particularly with direct current.

Another object of the invention is to provide an electrode of copper base alloy of the type referred to and which may be employed in the welding of iron, copper and nickel base alloys and the like.

Another object is to reduce the size of the globular transfer of metal across the arc, thereby producing a softer arc with less spatter and greater efficiency of deposit.

Another object is to provide a covered copper base alloy electrode in which the fluidity and physical characteristics of the slag is correlated to the metal deposit to produce a deposit of smooth bead contour, feather-edging properly into the base metal with a minimum of undercutting and surface pitting regardless of position.

Another object is to provide a gaseous shield of a reducing character that protects the weld metal from oxidation and which reduces the tendency of zinc in brasses to effervesce.

Another object is to provide a slag for the weld which readily floats out impurities from the weld pool and is friable and easily removed.

Another object is to provide a covering which does not require close tolerances in covering thickness and which is relatively insensitive to variations in composition of the core wire and in the welding current.

Another object is to provide a covering which may be applied by either dipping or extrusion processes with only minor changes in consistency.

Another object is to provide a covering for an electrode of the alloys referred to which will not interfere with re-striking of the arc after the electrode is partially consumed.

The covering comprises, in general, fluorides of alkaline earth metals, preferably of calcium and sodium, alkali metal carbonates such as calcium carbonate, a metal deoxidizer such as ferro-chromium or ferro-silicon, a cellulosic material such as alpha flock, and a binder such as sodium or potassium silicate.

The dry ingredients are first thoroughly mixed together, and then the wet ingredients are added to make a slurry for dipping of the core rods or a pulp for extrusion upon the rods. The consistency may be adjusted by additions of water, if desired, for dipping. For extrusion a part of the wet sodium silicate may be replaced by dry powdered sodium silicate. Generally .4 part of powdered sodium silicate is equivalent to about one part of wet sodium silicate (40°-42° Baumé).

One example of covering composition that has been found to be very satisfactory for tin bronze electrodes is as follows:

|  | Parts by Weight | Per Cent by Weight |
|---|---|---|
| Fluorspar (CaF₂) | 174 | 35.8 |
| Cryolite | 60 | 12.4 |
| Ferro-Chromium | 20 | 4.1 |
| Marble (CaCO₃) | 30 | 6.2 |
| Magnesite (MgCO₃) | 50 | 10.3 |
| Silica | 20 | 4.1 |
| Bentonite | 5 | 1.0 |
| Alpha Flock | 8 | 1.6 |
| Sodium Silicate (Dry) | 20 | 4.1 |
| Sodium Silicate (Wet) 42° Baumé | 100 | 20.4 |

Numerous modifications of the above covering have been employed for applying to Phosphor bronze core wires of varying tin contents from 5% to 10%, and a wide variety of silicon bronze and brass core wires. Such modifications depend upon the core wire composition and are generally based upon the melting point and electrical conductivity of the core wires.

Specific modifications are illustrated in the following table:

|  | Composition No. | | | | | |
|---|---|---|---|---|---|---|
|  | 1 | 2 | 3 | 4 | 5 | 6 |
| Fluorspar | 185 | 174 | 174 | 174 | 174 | 140 |
| Cryolite | 25 | 60 | 60 | 60 | 60 | 60 |
| FeCr |  | 20 | 20 | 5 | 10 | 20 |
| Marble |  | 30 | 30 | 30 | 30 | 30 |
| Magnesite | 80 | 50 | 50 | 50 | 50 | 50 |
| Silica |  | 20 | 25 | 20 | 20 | 20 |
| Bentonite |  | 5 |  | 5 | 5 | 5 |
| Alpha Flock |  | 4 | 8 | 8 | 8 | 8 |
| Sodium Silicate (Dry) | 20 | 20 | 20 | 20 | 20 | 20 |
| Carbon | 4 |  |  |  |  |  |
| Sodium Silicate (Wet) | 100 | 100 | 100 | 100 | 100 | 100 |

The bentonite is employed for extruded coverings, and where the coverings were to be dipped SiO₂ was substituted for it.

The alpha flock should be of about 200 mesh fineness for dipped coverings and about 40 mesh fineness for extruded coverings.

The wet sodium silicate was 42° Baumé.

In general the covering should have a melting point at which it disintegrates on the rod, somewhere related to the melting point for the metal of the rod. If the melting point or disintegrating point of the covering is at too high a temperature the covering will extend down beyond the tip of the metal core and surround the arc even to the extent of possible extinction of the arc.

If the melting or disintegrating point of the covering is at too low a temperature the covering will melt off ahead of the arc and leave the metal core bare at the tip, thereby failing to protect the metal as it melts and is transferred across the arc. Most copper alloys of the types referred to herein are not suitable for bare wire welding. Where the core wire is bare at the tip the metal transfers across the arc in drops or large globules and causes sputtering of the arc.

The desirable covering is one which will form a small crater around the arcing tip of the metal core and thereby physically protect the metal from contamination during melting and expulsion from the tip. The metal is then free to transfer across the arc in a fine spray and the arc action is smooth, thereby providing a more efficient deposit with less spatter.

In general the covering composition may contain the several ingredients in the following ranges:

| | Parts by weight |
|---|---|
| Fluorspar (CaF₂) | 140 to 200 |
| Cryolite | 90 to 30 |
| FeCr | 5 to 25 |
| Marble (CaCO₃) | 10 to 50 |
| Magnesite (MgCO₃) | 30 to 70 |
| Silica | 10 to 40 |
| Bentonite | 0 to 5 |
| Alpha Flock (Cellulose) | 0 to 25 |
| Sodium Silicate (Dry—powdered) | 0 to 30 |
| Sodium Silicate (Wet—42° Baumé) | 100 to 150 |
| Water added to provide the proper consistency for application to the rod. | |

The fluorides are important in floating out the oxides of copper, tin, silicon and zinc from the weld deposit, and also serve to adjust the melting point of the covering and the surface tension of the slag. If a higher melting point is desired as in the case of a phosphor bronze rod, the fluorspar content is increased. If a lower melting point is desired as for brass rods, the fluorspar content is decreased and the cryolite content increased. In some cases sodium fluoride may be substituted for the cryolite.

The ferro-chromium serves as a deoxidizer and controls to some extent the surface tension of the slag. Other ferro-alloys may be substituted for ferro-cromium, such as ferro-columbium, ferro-manganese, ferro-titanium, ferro-molybdenum, ferro-silicon, powdered iron and the like.

The ferro-alloys when combined with a fluoride type of covering serve to provide readily fluxed metal oxides and to protect the principal metals of the deposit against oxide inclusions.

Either marble or calcium carbonate may be used interchangeably for stabilizing the arc and additionally improving the surface tension of the slag and adjusting the melting point of the covering.

The magnesite or magnesium carbonate aids appreciably in stabilizing the arc and is important in controlling the arc penetration and in producing a friable slag having proper surface tension characteristics.

The silica and bentonite are slag forming ingredients and are added to provide a more friable slag and control the surface tension of the slag. The free silica combines with some of the metal oxides and removes the same to the resultant slag as silicates, thereby aiding in the fluxing of the weld deposit.

The alpha flock or cellulose decompose in the crater of the covering to form a reducing gas which permeates the arc region and tends to protect the metal in the arc stream against contamination by oxygen and nitrogen of the air. The cellulose provides a more uniform crater for the covering at the tip of the electrode and prevents finger-nailing of the covering. Other organic or carbonaceous materials may be substituted for a part or all of the alpha flock, i. e. materials such as wood flour, invert sugars, dextrine, carbon and petroleum coke.

Either sodium silicate or potassium silicate may be used as the binder. They determine the burn-off characteristics of the rod and also aid in controlling the surface tension of the slag. Where sodium silicate is used, the proportionate amounts of dry (powdered) silicate and of wet silicate may be varied depending upon the method of application of the covering to the core wire. The covering mixture should contain more of the dry sodium silicate and less of the wet sodium silicate for use in the extrusion process and vice-versa for use in the dipping process.

The thickness of the covering on the rod will vary with the process of application and should be between about .015" and .025". The actual weight of the covering as compared to that of the rod may vary depending upon the size of the core wire. In general, the coating will be from about 7 to about 22 per cent of the total weight of the rod, the smaller per cent being present with large core wires of about one-quarter inch in diameter and the larger per cent being present with core wires of about one-eighth inch and less in diameter.

The deposit obtained with the present electrodes is dense and sound, and is free from internal porosity and slag inclusions. It has improved physical properties resulting from the use of the covering.

The addition of cellulose to the fluoride slag type of covering tends to reduce oxidation of the metal as it passes through the arc, just enough to effect a sound deposit that can be efficiently fluxed by the slag. The cellulose additionally controls the covering crater and aids in producing a steady arc. The ferro-alloy deoxidizes the melt and facilitates the fluxing action of the fluoride slag.

The covering enables the arc deposit of various copper alloys which could not be satisfactorily deposited heretofore.

Various embodiments of the invention may be employed within the scope of the accompanying claims.

I claim:

1. A covering for a copper-base alloy electrode of the class described comprising fluoride slag producing ingredients and a binder, with the fluorides selected from alkaline earth metal fluorides and containing principally calcium fluoride, and an alkali metal carbonate in an amount sufficient to improve the surface tension of the slag, the ingredients being proportioned to provide a covering having a low disintegration temperature correlated to the melting point of the metallic core of the electrode.

2. A covering for a copper base alloy electrode of the class described comprising fluoride slag producing ingredients and a binder, with the fluorides selected from alkaline earth metal fluorides and containing principally calcium fluoride, and a magnesium compound to increase the arc penetration and improve the physical properties of the slag, the ingredients being proportioned to provide a covering having a low disintegration temperature correlated to the melting point of the metallic core of the electrode.

3. A covering for a copper base alloy electrode of the class described comprising fluoride slag producing ingredients and a binder, with the fluorides selected from alkaline earth metal fluorides and containing principally calcium fluoride, and a ferro-alloy deoxidizer to facilitate the fluxing action of the slag, the ingredients being proportioned to provide a covering having a low disintegration temperature correlated to the melting point of the metallic core of the electrode.

4. A covering for a copper base alloy electrode of the class described comprising fluoride slag producing ingredients and a binder, with the fluorides selected from alkaline earth metal fluorides and containing principally calcium fluoride, and a carbonaceous constituent to improve the burn-off characteristics of the covering and prevent excessive oxidation of the metal transferring through the arc, the ingredients being proportioned to provide a covering having a low disintegration temperature correlated to the melting point of the metallic core of the electrode.

5. A covering for a copper base alloy electrode of the class described comprising fluoride slag producing ingredients and a binder, with the fluorides selected from alkaline earth metal fluorides and containing principally calcium fluoride, a ferro-alloy deoxidizer to facilitate the fluxing action of the slag, and a carbonaceous constituent to improve the burn-off characteristics of the covering and prevent excessive oxidation of the metal transferring through the arc, the ingredients being proportioned to provide a covering having a low disintegration temperature correlated to the melting point of the metallic core of the electrode.

6. A covering for a copper base alloy electrode of the class described comprising fluoride slag producing ingredients and a binder, with the fluorides selected from alkaline earth metal fluorides and containing principally calcium fluoride, calcium carbonate in an amount sufficient to improve the surface tension of the slag, and a magnesium compound to increase the arc penetration and improve the physical properties of the slag, the ingredients being proportioned to provide a covering having a low disintegration temperature correlated to the melting point of the metallic core of the electrode.

7. A covering for a copper base alloy electrode of the class described comprising fluoride slag producing ingredients and a binder, with the fluorides selected from alkaline earth metal fluorides and containing principally calcium fluoride, calcium carbonate in an amount sufficient to improve the surface tension of the slag, a magnesium compound to increase the arc penetration and improve the physical properties of the slag, and a ferro-alloy to facilitate the fluxing action of the slag, the ingredients being proportioned to provide a covering having a low disintegration temperature correlated to the melting point of the metallic core of the electrode.

8. A covering for a copper base alloy electrode of the class described comprising fluoride slag producing ingredients and a binder, with the fluorides selected from alkaline earth metal fluorides and containing principally calcium fluoride, calcium carbonate in an amount sufficient to improve the surface tension of the slag, a magnesium compound to increase the arc penetration and improve the physical properties of the slag, and a cellulose constituent to improve the burn-off characteristics of the covering and prevent excessive oxidation of the metal transferring through the arc, the ingredients being proportioned to provide a covering having a low disintegration temperature correlated to the melting point of the metallic core of the electrode.

9. A covering for a copper base alloy electrode of the class described comprising fluoride slag producing ingredients and a binder, with the fluorides selected from alkaline earth metal fluorides and containing principally calcium fluoride, calcium carbonate in an amount sufficient to improve the surface tension of the slag, a ferro-alloy to facilitate the fluxing action of the slag, a magnesium compound to increase the arc penetration and improve the physical properties of the slag, and a cellulose constituent to improve the burn-off characteristics of the covering and prevent excessive oxidation of the metal transferring through the arc, the ingredients being proportioned to provide a covering having a low disintegration temperature correlated to the melting point of the metallic core of the electrode.

10. A covering for a copper base alloy electrode of the class described comprising principally the following ingredients in the composition ranges indicated in parts by weight: fluorspar 140 to 200, cryolite 90 to 30, ferro-alloy 5 to 25, marble 10 to 50, magnesite 30 to 70, silica 10 to 40, and a binder of sodium silicate constituting from 100 to 150 parts.

11. A covering for a copper base alloy electrode of the class described comprising principally the following ingredients in the composition ranges indicated in parts by weight: fluorspar 140 to 200, cryolite 90 to 30, ferro-alloy 5 to 25, marble 10 to 50, magnesite 30 to 70, silica 10 to 40, a binder of sodium silicate constituting from 100 to 150 parts, and bentonite up to about 5 parts to facilitate extrusion of the composition upon the rod.

12. A covering for a copper base alloy electrode of the class described comprising principally the following ingredients in the composition ranges indicated in parts by weight: fluorspar 140 to 200, cryolite 90 to 30, ferro-alloy 5 to 25, marble 10 to 50, magnesite 30 to 70, silica 10 to 40, a binder of sodium silicate constituting from 100 to 150 parts, and cellulosic material up to about 25 parts.

13. A covering for a copper base alloy welding electrode of the class described, comprising principally the following ingredients in the composition ranges indicated in parts by weight: fluorides of alkaline earth metals 170 to 290 principally in the form of calcium fluoride, a ferro-alloy deoxidizer 5 to 25, an alkali metal carbonate 40 to 120 and a silicate binder therefor.

14. A covering for a copper base alloy welding electrode of the class described, comprising principally the following ingredients in the composition ranges indicated in parts by weight: fluorides of alkaline earth metals 170 to 290 principally in the form of calcium fluoride, a ferro-alloy deoxidizer 5 to 25 principally in the form of ferro-chromium, an alkali metal carbonate 40 to 120 principally in the form of calcium carbonate, and a silicate binder therefor.

15. A covering for a copper base alloy welding electrode of the class described, comprising principally the following ingredients in the composition ranges indicated in parts by weight: fluorides of alkaline earth metals selected to correspond to a fluorspar and cryolite mixture having from 140 to 200 parts of fluorspar and 90 to 30 parts of cryolite, a ferro-alloy deoxidizer corresponding to a ferro-chromium content of 5 to 25 parts, an alkali metal carbonate content corresponding to a mixture of calcium carbonate and magnesium carbonate having from 10 to 50 parts of calcium carbonate and from 30 to 70 parts of magnesium carbonate, and a binder therefor.

16. A covering for a copper base alloy welding electrode of the class described, comprising principally the following ingredients in the composition ranges indicated in parts by weight: fluorides of alkaline earth metals selected to correspond to a fluorspar and cryolite mixture having from 140 to 200 parts of fluorspar and 90 to 30 parts of cryolite, a ferro-alloy deoxidizer corresponding to a ferro-chromium content of 5 to 25 parts, an alkali metal carbonate content corresponding to a mixture of calcium carbonate and magnesium carbonate having from 10 to 50 parts of calcium carbonate and from 30 to 70 parts of magnesium carbonate, a carbonaceous ingredient corresponding to a cellulose content up to about 25 parts, and a binder therefor.

17. A covering for a copper base alloy welding electrode of the class described, comprising principally the following ingredients in the composition ranges indicated in parts by weight: fluorides of alkaline earth metals selected to correspond to a fluorspar and cryolite mixture having from 140 to 200 parts of fluorspar and 90 to 30 parts of cryolite, a ferro-alloy deoxidizer corresponding to a ferro-chromium content of 5 to 25 parts, an alkali metal carbonate content corresponding to a mixture of calcium carbonate and magnesium carbonate having from 10 to 50 parts of calcium carbonate and from 30 to 70 parts of magnesium carbonate, a carbonaceous ingredient corresponding to a cellulose content up to about 25 parts, silica 10 to 40 parts, and a binder therefor.

FRANCIS E. GARRIOTT.

REFERENCES CITED

The following references are of record in the file of this patent:

UNITED STATES PATENTS

| Number | Name | Date |
|---|---|---|
| 2,320,677 | Swift | June 1, 1943 |